US006851510B2

(12) United States Patent
Furumi et al.

(10) Patent No.: US 6,851,510 B2
(45) Date of Patent: Feb. 8, 2005

(54) REAR-WHEEL STEERING DEVICE FOR VEHICLE

(75) Inventors: Hiroshi Furumi, Saitama (JP); Kunio Shirakawa, Saitama (JP); Kiyohide Nagase, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/370,419

(22) Filed: Feb. 20, 2003

(65) Prior Publication Data

US 2004/0003956 A1 Jan. 8, 2004

(30) Foreign Application Priority Data

Feb. 21, 2002 (JP) ........................... 2002-044568
Feb. 21, 2002 (JP) ........................... 2002-044569

(51) Int. Cl.[7] .............................................. B62D 5/04
(52) U.S. Cl. ........................................ 180/445; 180/444
(58) Field of Search ........................... 180/404, 412, 180/443, 444, 445; 74/388 PS (56) References Cited

U.S. PATENT DOCUMENTS

| 4,715,462 A | * 12/1987 | Taig .............................. 180/444 |
| 4,953,648 A | * 9/1990 | Ohmura ......................... 180/445 |
| 5,014,801 A | * 5/1991 | Hirose ........................... 180/412 |
| 5,068,584 A | * 11/1991 | Herent et al. ................. 318/549 |
| 5,257,191 A | * 10/1993 | Takehara et al. ............... 701/43 |
| 5,899,294 A | * 5/1999 | Shimizu et al. ............... 180/444 |
| 6,053,270 A | * 4/2000 | Nishikawa et al. ............ 180/168 |
| 6,381,527 B1 | * 4/2002 | Furumi et al. .................. 701/41 |

FOREIGN PATENT DOCUMENTS

JP 06-127409 5/1994

* cited by examiner

Primary Examiner—Lesley D. Morris
Assistant Examiner—Daniel Yeagley
(74) Attorney, Agent, or Firm—Carrier, Blackman & Associates, P.C.; William D. Blackman; Joseph P. Carrier

(57) ABSTRACT

A worm gear and an irreversible clutch mechanism adapted to permit the transmission of a driving force from an actuator toward rear wheels and to inhibit the transmission of the driving force in a reverse direction, are disposed at upstream and downstream locations in a power-transmitting path for transmitting the driving force from the actuator to the rear wheels, respectively. The driving force transmitted in the reverse direction from the rear wheels toward the actuator is blocked by both the irreversible clutch mechanism and the worm gear. Therefore, the steering angle of the rear wheels can be reliably prevented from changing from a desired angle. Further, even when one of the irreversible clutch mechanism and the worm gear is broken, the function of inhibiting the reverse transmission of the driving force can be maintained. Especially, because the irreversible clutch mechanism having a chattering smaller as compared with the worm gear is disposed in the downstream location, the rigidity of the rear wheels against a load from a road surface can be effectively enhanced.

12 Claims, 8 Drawing Sheets

REAR-WHEEL STEERING DEVICE FOR VEHICLE

BACKGROUND OF THE INVENTION

1. Field of the Invention

The present invention relates to a rear-wheel steering device for a vehicle, which is designed to steer rear wheels by an actuator in operable association with the steering of front wheels by the operation of a steering wheel.

2. Description of the Related Art

A conventional rear-wheel steering device for a vehicle is known from, for example, Japanese Patent Application Laid-open No. 6-127409.

When an abnormality occurs in a control system for the actuator in the rear-wheel steering device for the vehicle, the vehicle steering is switched from a four-wheel steering state to a front-wheel steering state while a steering angle of the rear wheels is fixed, so that the vehicle may continue traveling without problem. In this case, if the steering angle of the rear wheels is small (e.g., 1° or less), the electric current supply to the actuator is cut off, while maintaining the small steering angle. If the steering angle of the rear wheels is large, the actuator is temporarily driven to return the steering angle of the rear wheels to zero, and thereafter the electric current supply to the actuator is cut off.

When the vehicle is traveling in the state in which the steering angle of the rear wheels is fixed as described above, if the steering angle of the rear wheels is changed due to a load from a road surface, the subsequent traveling of the vehicle may be hindered. Therefore, a worm gear is conventionally disposed in a path of transmission of a driving force from the actuator to the rear wheels so that the transmission of the driving force from the side of the rear wheels toward the actuator is inhibited during an abnormal operation, thereby preventing undesired changes in the steering angle of the rear wheels, while permitting the transmission of the driving force from the side of actuator towards the rear wheels during a normal operation.

However, it is difficult to inhibit the reverse transmission of the driving force from the side of the rear wheels toward the actuator only by means of the worm gear, and there is a possibility that the steering angle of the rear wheels is gradually changed due to an external force or the like, while the vehicle continues to travel.

SUMMARY OF THE INVENTION

Accordingly, it is an object of the present invention to provide a rear-wheel steering device for a vehicle which is designed to steer the rear wheels by the operation of an actuator, wherein the steering angle of the rear wheels is prevented from accidentally changing due to an external force or the like.

To achieve the above object, according to a first feature of the present invention, there is provided a rear-wheel steering device for a vehicle, which is designed to steer the rear wheels by operation of an actuator in operable association with steering of front wheels by operation of a steering wheel, the rear-wheel steering device comprising: an irreversible gear mechanism which is disposed at an upstream location in a power-transmitting path for transmitting a driving force from the actuator to the rear wheels and which is adapted to permit the transmission of the driving force from the side of the actuator toward the rear wheels and to inhibit the transmission of the driving force in a reverse direction; and an irreversible clutch mechanism which is disposed at a downstream location in the power-transmitting path and which is adapted to permit the transmission of the driving force from the side of the actuator toward the rear wheels and to inhibit the transmission of the driving force in the reverse direction.

With the above arrangement, the irreversible gear mechanism and the irreversible clutch mechanism are disposed at the upstream and downstream locations respectively in the power-transmitting path. Therefore, the driving force transmitted in the reverse direction from the side of the rear wheels toward the actuator can be blocked by both the irreversible clutch mechanism and the irreversible gear mechanism, whereby the steering angle of the rear wheels can be reliably prevented from changing. Further, even when one of the irreversible clutch mechanism and the irreversible gear mechanism is broken down, the function of inhibiting the reverse transmission of the driving force can be maintained. Especially, because the irreversible clutch mechanism, which has a smaller chattering as compared with the irreversible gear mechanism, is disposed in the downstream location in the power-transmitting path, the rigidity of the rear wheels against a load from a road surface can be effectively enhanced.

According to a second feature of the present invention, in addition to the first feature, the irreversible gear mechanism comprises a worm and a worm wheel, and the irreversible clutch mechanism is disposed within the worm wheel.

With the above arrangement, the irreversible gear mechanism comprises the worm and the worm wheel, and the irreversible clutch mechanism is disposed within the worm wheel. Therefore, the space for these components can be reduced and thus the size of the entire rear-wheel steering device can be reduced, as compared with a case where the irreversible gear mechanism and the irreversible clutch mechanism are disposed independently from each other. The worm gear may be provided with a characteristic that if a reverse efficiency of transmission of the driving force from the side of the worm wheel toward the worm is set to be low, a normal efficiency of transmission of the driving force from the side of the worm toward the worm wheel is also decreased. Therefore, even if the actuator is rotated little by little due to the vibration, the transmission of the driving force can be inhibited by the worm gear having the decreased normal efficiency, whereby the steering angle of the rear wheels can be prevented from changing.

According to a third feature of the present invention, there is provided a rear-wheel steering device for a vehicle, which is designed to steer the rear wheels by operation of an actuator in operable association with steering of front wheels by operation of a steering wheel, the rear-wheel steering device comprising an irreversible gear mechanism and an irreversible clutch mechanism, which are disposed in a power-transmitting path for transmitting a driving force from the actuator to the rear wheels and which are adapted to permit the transmission of the driving force from the side of the actuator toward the rear wheels and to inhibit the transmission of the driving force in a reverse direction.

With the above arrangement, the irreversible gear mechanism and the irreversible clutch mechanism are disposed in the power-transmitting path for transmitting the driving force from the actuator to the rear wheels. Therefore, the driving force transmitted in the reverse direction from the side of the rear wheels toward the actuator can be blocked by both the irreversible clutch mechanism and the irreversible gear mechanism, whereby the steering angle of the rear wheels can be reliably prevented from changing when so desired. Further, even when one of the irreversible clutch mechanism and the irreversible gear mechanism is broken down, the function of inhibiting the reverse transmission of the driving force can be maintained.

A worm gear 42 in each of embodiments corresponds to the irreversible gear mechanism of the present invention.

The above and other objects, features and advantages of the invention will become apparent from the following description of the present embodiments taken in conjunction with the accompanying drawings.

BRIEF DESCRIPTION OF THE DRAWINGS

FIGS. 1 to 6 show a first embodiment of the present invention, wherein

FIGS. 7 and 8 show a second embodiment of the present invention, wherein

DETAILED DESCRIPTION OF THE EMBODIMENTS

A first embodiment of the present invention will now be described with reference to FIGS. 1 to 6.

Figure 1:
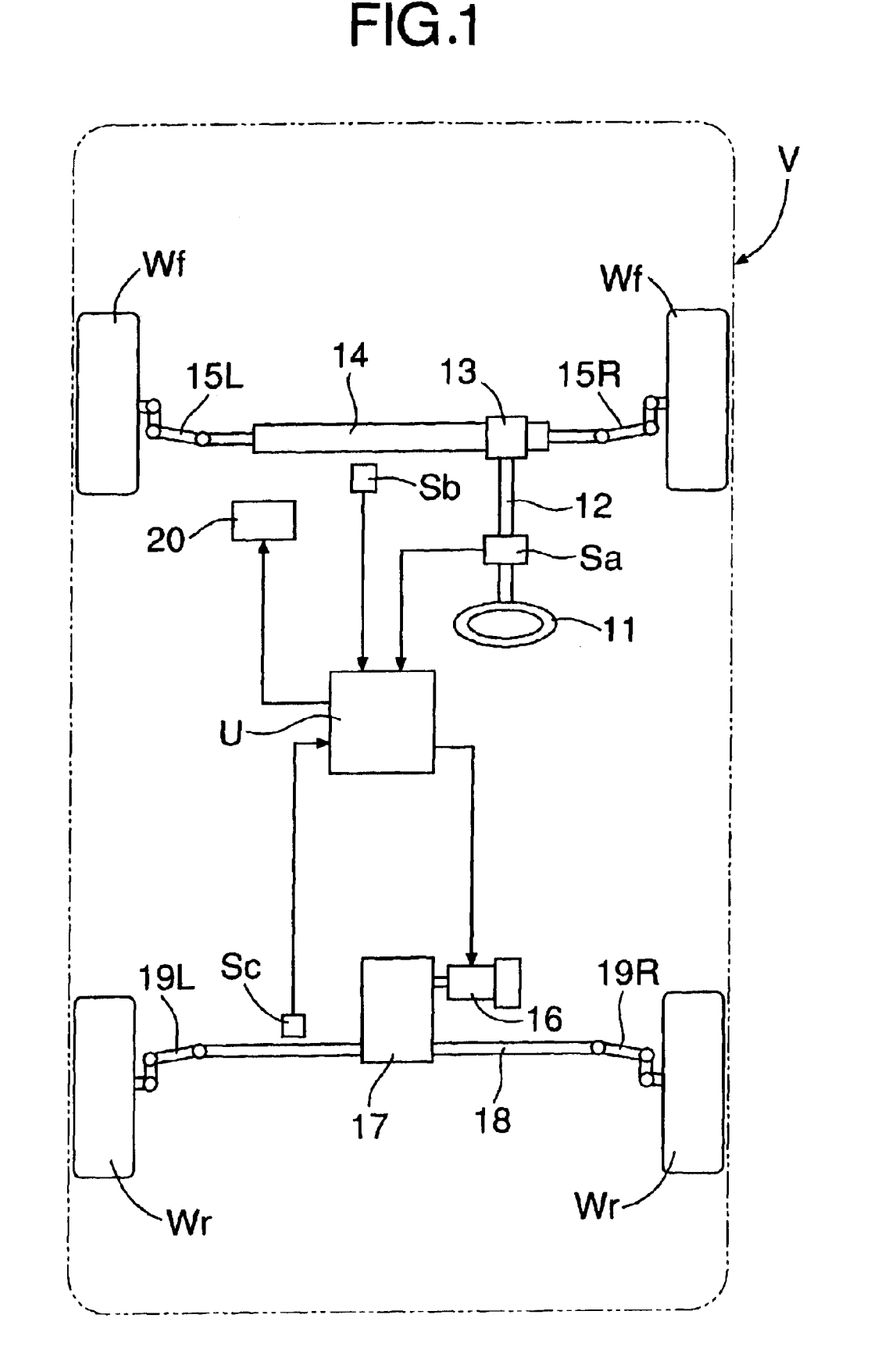
FIG. 1 is an illustration showing the entire arrangement of a four-wheel steering vehicle.

Referring first to FIG. 1, a 4-wheel steering vehicle V includes left and right front wheels Wf, Wf capable of being steered, and left and right rear wheels Wr, Wr capable of being steered in operable association with the steering of the front wheels Wf, Wf. The front wheels Wf, Wf are steered by the operation of a steering wheel 11 by a driver, the operation being transmitted to the front wheels Wf, Wf through a steering shaft 12, a steering gear box 13, a steering rod 14 and left and right tie rods 15L and 15R. A power steering device for assisting the steering operation by the driver, is mounted as required. The rear wheels Wr, Wr are steered by an actuator 16 comprising an electric motor. A driving force provided by the actuator 16 is transmitted to the rear wheels Wr, Wr through a steering gear box 17, a steering rod 18 and left and right tie rods 19L and 19R.

The actuator 16 for steering the rear wheels Wr, Wr is controlled by an electronic control unit U. Signals are input to the electronic control unit U from a steering angle sensor Sa for detecting a steering angle of the steering wheel 11, a vehicle speed sensor Sb for detecting a vehicle speed, and a steering angle sensor Sc for detecting a steering angle of the rear wheels Wr, Wr (namely, a position of the steering rod 18). Based on these signals, the electronic control unit U controls the operation of the actuator 16 and the operation of a warning apparatus 20.

More specifically, the steering angle for the rear wheels Wr, Wr has a predetermined ratio relative to the steering angle of the front wheels Wf, Wf (namely, the steering angle detected by the steering angle sensor Sa). The ratio is set so that it is smaller when the vehicle speed detected by the vehicle speed sensor Sb is larger, and it is larger when the vehicle speed is smaller. Thus, when the garaging of the vehicle or the like is carried out, the steering angle of the rear wheels Wr, Wr can be increased to enable a small turning radius, and when the vehicle travels on a highway or the like, the steering angle of the rear wheels Wr, Wr can be decreased to enhance the travel stability of the vehicle.

When an abnormality occurs in a control system for the actuator 16, the actuator 16 is operated so that the steering angle of the rear wheels Wr, Wr detected by the steering angle sensor Sc becomes zero (neutral position), and at this position, the electric current supplied to the actuator 16 is cut off, and the warning apparatus 20 is operated to issue a warning to the driver. In this way, when the steering of the rear wheels Wr, Wr is disabled, the vehicle can thereafter continue to travel as a front-wheel steering vehicle by returning the rear wheel steering angle to zero (neutral position).

Figure 2:
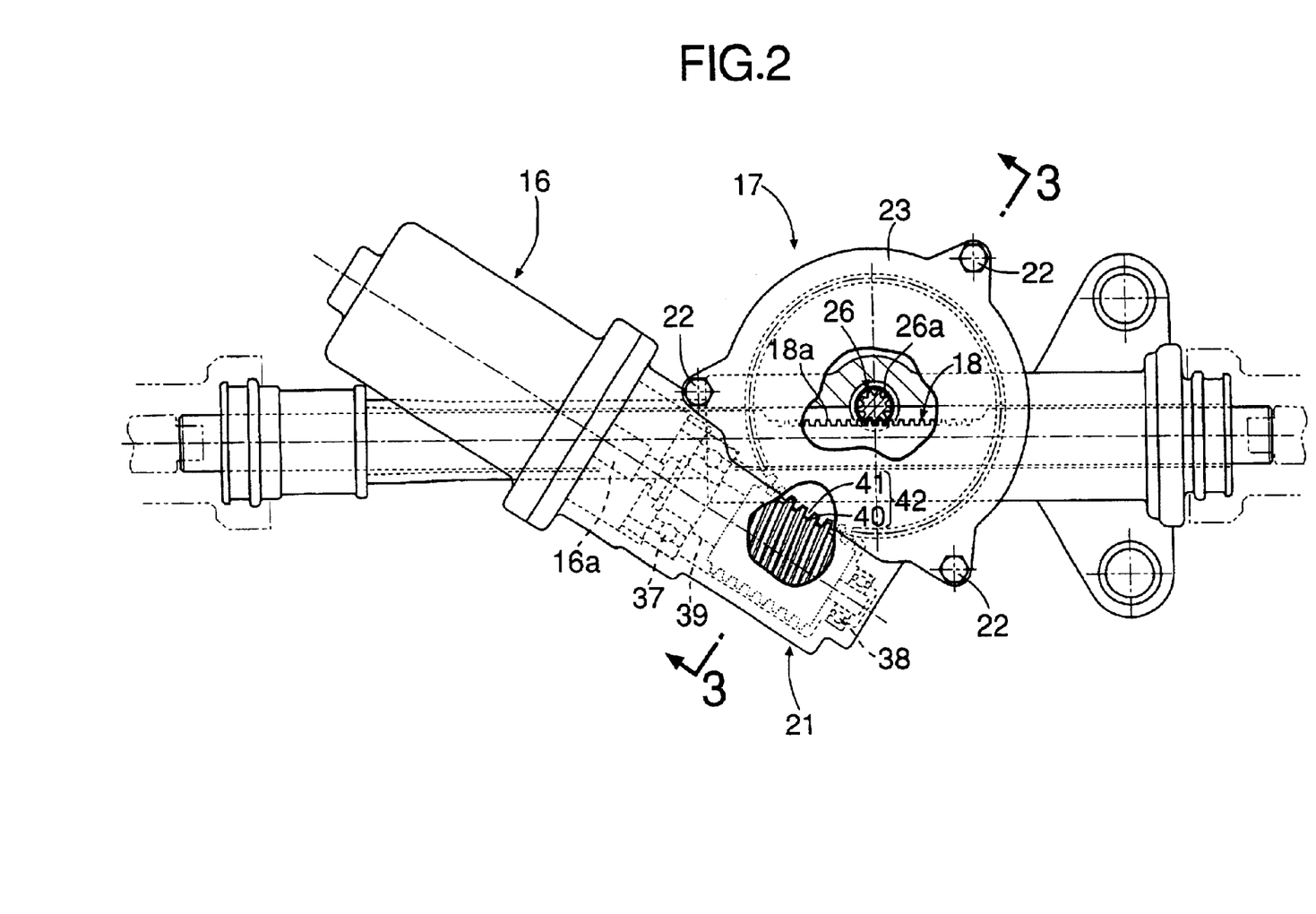
FIG. 2 is a plan view of a steering gear box for rear wheels.
Figure 3:
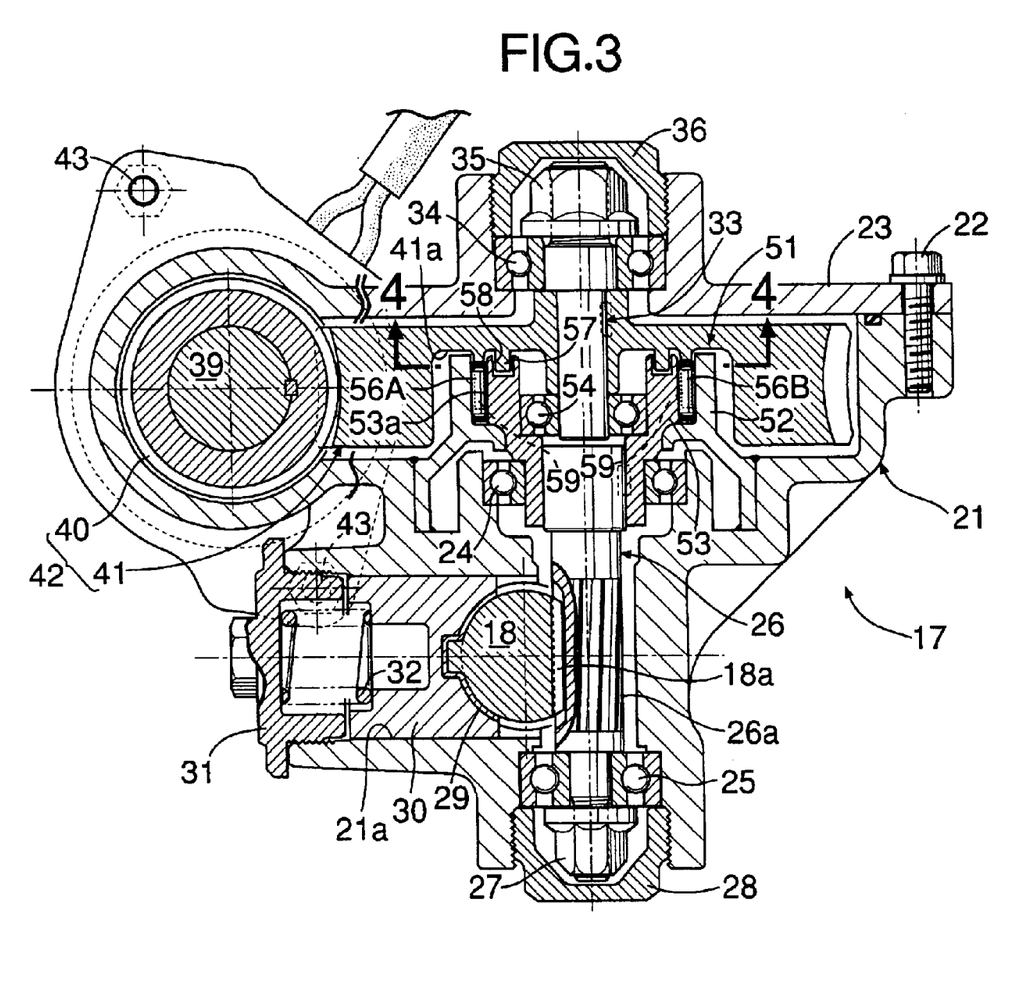
FIG. 3 is a sectional view taken along a line 3—3 in FIG. 2.

The structure of the steering gear box 17 for the rear wheels Wr, Wr will be described below with reference to FIGS. 2 to 4.

The steering gear box 17 includes a casing 21 slidably supporting the steering rod 18, and a cover 23 coupled by bolts 22 in an opening in an upper surface of the casing 21. A pinion 26a integrally formed on an output shaft 26 supported in the casing 21 by a pair of ball bearings 24 and 25, is meshed with a rack 18a integrally formed on the steering rod 18. A lower end of the output shaft 26 is positioned axially relative to the lower ball bearing 25 by a nut 27. The lower portion of the nut 27 is covered by a cap 28 threadedly coupled to the casing 21.

An urging member 30 including a sliding member 29 at its tip end is slidably fitted into a through-bore 21a defined in the casing 21 in a direction perpendicular to the output shaft 26. The urging member 30 is biased toward the steering rod 18 by a spring 32 disposed between the urging member 30 and a spring seat 31 threadedly coupled to an open end of the through-bore 21a. The meshing relationship between the rack 18a and the pinion 26a can be appropriately maintained without an increase in resistance to the sliding movement of the steering rod 18, because the sliding member 29 mounted at the tip end of the urging member 30 slidably abuts against a back of the steering rod 18.

An input shaft 33 disposed coaxially at an upper portion of the output shaft 26 is supported at its upper end on the cover 23 for the casing 21 with a ball bearing 34 interposed therebetween. The upper end of the input shaft 33 is positioned axially relative to the ball bearing 34 by a nut 35. The upper portion of the nut 35 is covered by a cap 36 threadedly coupled to the cover 23. A worm shaft 39 is supported on the casing 21 with a pair of ball bearings 37 and 38 interposed therebetween. A worm 40 integrally formed on the worm shaft 39 is meshed with a worm wheel 41 integrally formed on the input shaft 33. A worm gear 42 comprising the worm 40 and the worm wheel 41 constitutes an irreversible gear mechanism of the present invention.

The actuator 16 is fixed to the casing 21 by bolts 43, 43, and the worm shaft 39 is coupled in series to a rotary shaft 16a of the actuator 16. Therefore, when the actuator 16 is driven, the worm 40 is rotated along with the worm shaft 39 connected to the rotary shaft 16a, whereby the worm wheel 41 meshed with the worm 40 is rotated to rotate the input shaft 33.

An irreversible clutch mechanism 51 is disposed in a recess 41a defined by depressing a lower surface of the worm wheel 41. The irreversible clutch mechanism 51 is adapted to permit the transmission of the driving force from the side of the input shaft 33 toward the output shaft 26, and to inhibit the transmission of the driving force from the side of the output shaft 26 toward the input shaft 33. One example of the structure of the irreversible clutch mechanism 51 will be described below.

The irreversible clutch mechanism 51 includes an outer member 52 fixed to the casing 21, and an inner member 53 disposed coaxially on an inner periphery of the outer member 52 and fixed to the output shaft 26. The input shaft 33 is relatively rotatably supported at its lower end on an inner periphery of the inner member 53 with a ball bearing 54 interposed therebetween. Eight flat faces 53a are formed at distances with 45° on an outer peripheral surface of the inner member 53 having a substantially cylindrical shape. A pair of needle rollers 56A and 56B biased in a direction away from each other by a spring 55 are disposed between each of the flat faces 53a and an inner peripheral surface of the cylindrical outer member 52.

A plurality of pins 57 axially protrude from the recess 41a of the worm wheel 41, and are loosely fitted into a plurality of pinholes 58 made in an end face of the inner member 53, so that an annular clearance a (see FIG. 4) is provided between each of the pins 57 and a wall of each of the pinholes 58. Each of a plurality of disengaging projections 59 axially protrudes from the recess 41a of the worm wheel 41, and faces circumferentially opposed sides of the pair of the needle rollers 56A and 56B with a clearance β left therebetween. The relationship between the clearances α and β is set at α>β (see FIG. 4).

The operation of the embodiment of the present invention having the above-described arrangement will be described below.

When the actuator 16 is operated to steer the rear wheels Wr, Wr with the steering of the front wheels Wf, Wf, the rotation of the rotary shaft 16a of the actuator 16 is transmitted through the worm shaft 39 and the worm 40 to the worm wheel 41. When the worm wheel 41 is rotated in a direction indicated by an arrow A in FIG. 5, each of the disengaging projections 59 integral with the worm wheel 41 urges one 56A of the needle rollers toward the other needle rollers 56B against a repulsive force of the spring 55, before the pins 57 integral with the worm wheel 41 are brought into abutment against walls of the pinholes 58 in the inner member 53, because the clearance α shown in FIG. 4 is set larger than the clearance β. As a result, each of the one needle rollers 56A is inhibited from biting into a wedge-shaped space defined by each of the flat faces 53a of the inner member 53 and the inner peripheral surface of the outer member 52, and the clearance a is soon narrowed, whereby the pins 57 of the worm wheel 41 are brought into abutment against the walls of the pinholes 58 in the inner member 53. Thus, the rotation of the worm wheel 41 in the direction indicated by the arrow A is transmitted from the pins 57 through the pinholes 58 to the inner member 53, and therefrom through the output shaft 26, the pinion 26a and the rack 18a to the steering rod 18, to thereby steer the rear wheels Wr, Wr in one of lateral directions.

Figure 5:
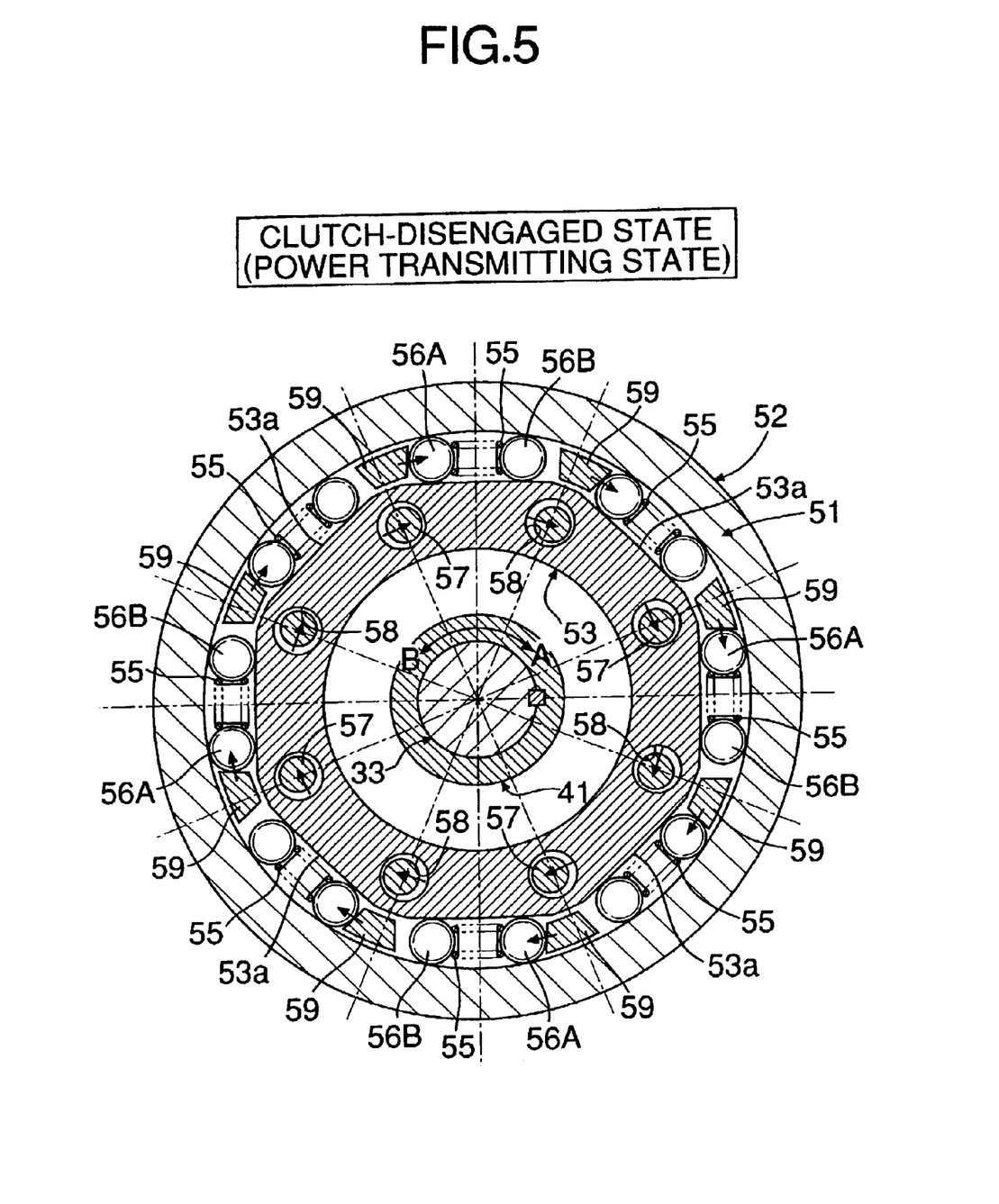
FIG. 5 is a view similar to FIG. 4 for explaining the operation.

On the other hand, when the worm wheel 41 is rotated in an opposite direction indicated by an arrow B in FIG. 5, the disengaging projections 59 integral with the worm wheel 41 urge the other needle rollers 56B toward the one needle rollers 56A against the repulsive forces of the springs 55, and hence the other needle rollers 56B are inhibited from biting into the wedge-shaped spaces defined by the flat faces 53a of the inner member 53 and the inner peripheral surface of the outer member 52, respectively. Therefore, when the clearances a are narrowed, whereby the pins 57 of the worm wheel 41 are brought into abutment against the wall of the pinholes 58 of the inner member 53, the rotation of the worm wheel 41 in the direction indicated by the arrow B is transmitted from the pins 57 through the pinholes 58 to the inner member 53, and therefrom through the output shaft, he pinion 26a and the rack 18a to the steering rod 18, to thereby steer the rear wheels Wr, Wr in the other lateral direction.

When the actuator 16 is rotated in any of the lateral directions as described above, the driving force provided by the actuator 16 is transmitted through the irreversible clutch mechanism 41 without hindrance, whereby the rear wheels Wr, Wr can be steered in any of the lateral directions.

When an abnormality occurs in the steering system for the rear wheels Wr, Wr, the actuator 16 is operated by a command from the electronic control unit U so that the steering angle for the rear wheels Wr, Wr becomes zero, and the electric current supplying to the actuator 16 is then stopped. When the vehicle V continues to travel in this state, a load received from a road surface by the rear wheels Wr, Wr is transmitted from the steering rod 18 through the rack 18a, the pinion 26a and the output shaft 26 to the inner member 53 of the irreversible clutch mechanism 51.

Figure 4:
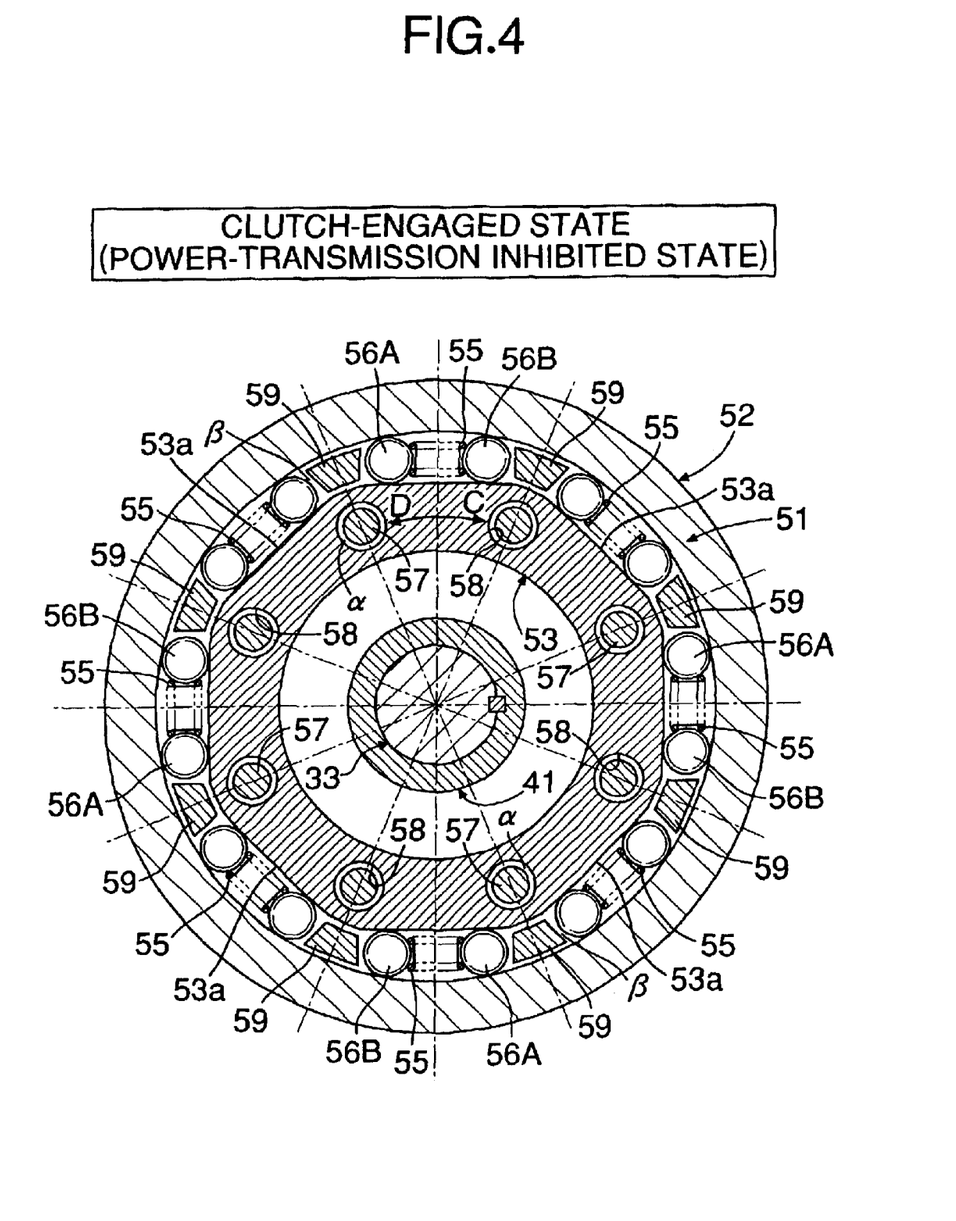
FIG. 4 is a sectional view taken along a line 4—4 in FIG. 3.

When the inner member 53 is about to be rotated in a direction indicated by an arrow C in FIG. 4, the one needle rollers 56A bite into the wedge-shaped spaces defined by the flat faces 53a of the inner member 53 and the inner peripheral surface of the outer member 52, whereby the inner member 53 is coupled to the outer member 52 integral with the casing 21, to be non-rotatably locked to the casing 21. On the other hand, when the inner member 53 is about to be rotated in a direction indicated by an arrow D in FIG. 4, the other needle rollers 56B bite immediately into the wedge-shaped spaces defined by the flat faces 53a of the inner member 53 and the inner peripheral surface of the outer member 52, whereby the inner member 53 is coupled to the outer member 52 integral with the casing 21, to be non-rotatably locked to the casing 21.

Even if the load is applied from the road surface to the rear wheels Wr, Wr in the state in which the electric current supplying to the actuator 16 is stopped as described above, the reverse transmission of the driving force to the actuator 16 due to the load is inhibited by the irreversible clutch mechanism 51, and hence it is possible to prevent the steering angle of the rear wheels Wr, Wr from accidentally changing to affect the traveling state of the vehicle.

The worm gear 42 has a function to merely transmit the driving force from the side of the worm 40 toward the worm wheel 41 and to inhibit the transmission of the driving force from the side of the worm wheel 41 toward the worm 40. Therefore, even if the irreversible clutch mechanism 51 does not function normally, permitting the driving force from the rear wheels Wr, Wr to be transmitted through the irreversible clutch mechanism 51 to the worm gear 42, the transmission of the driving force to the actuator 16 is inhibited at the worm gear 42.

Because the worm gear 42 and the irreversible clutch mechanism 51 are disposed in series in a path for transmitting the driving force from the actuator 16 to the rear wheels Wr, Wr, as described above, it is possible to reliably prevent the reverse transmission of the driving force from the rear wheels Wr, Wr toward the actuator 16. Further, even when the irreversible clutch mechanism 51 is broken down, the reverse transmission of the driving force can be inhibited by the worm gear 42. Especially, because the irreversible clutch mechanism 51 for inhibiting the reverse transmission of the driving force with a chattering smaller than that of the worm gear 42 is disposed at a location closer to the rear wheels Wr, Wr than the worm gear 42, it is possible to effectively enhance the rigidity of the rear wheels Wr, Wr against the load from the road surface.

Figure 6:
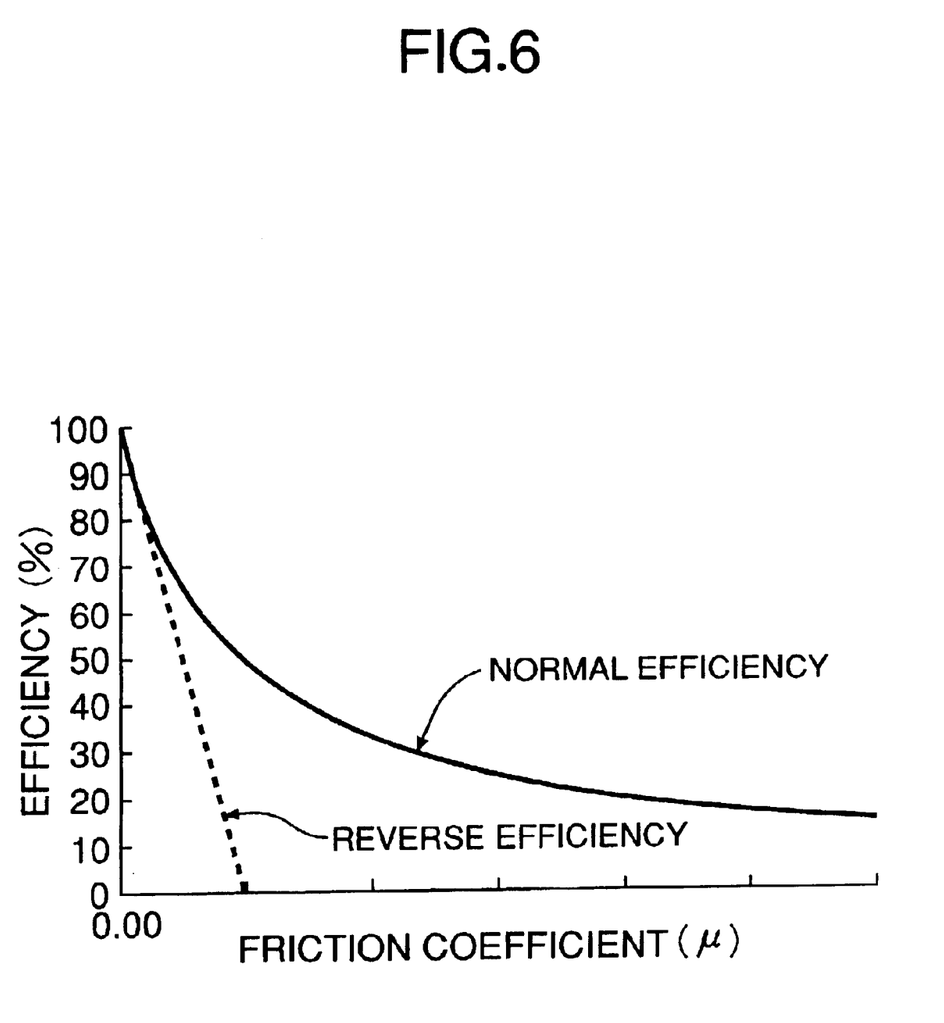
FIG. 6 is a graph showing a normal efficiency and a reverse efficiency of a worm gear in the first embodiment.

A graph of FIG. 6 shows how a normal efficiency and a reverse efficiency of the worm gear 42 change depending on a friction coefficient of a meshed portion. In the present specification, the normal efficiency is an efficiency provided when the driving force is transmitted from the side of the worm 40 toward the worm wheel 41, and the reverse efficiency is an efficiency provided when the driving force is transmitted from the side of the worm wheel 41 toward the worm 40. It can be seen that the worm gear 42 has a characteristic that if the reverse efficiency is set at zero in a region where the friction coefficient is equal to or larger than a predetermined value in order to provide the worm gear 42 with an irreversible function, the normal efficiency is also decreased accordingly.

The reason why the steering angle for the rear wheels Wr, Wr is changing during stoppage of the actuator 16 is that the rotary shaft 16a of the actuator 16 is rotated little by little due to the vibration of a vehicle body, in addition to the above-described reverse transmission of the driving force from the side the rear wheels Wr, Wr toward the actuator 16. However, in the worm gear 42 with the reverse efficiency set at zero, a normal efficiency is also decreased, and hence even when the rotary shaft 16a of the actuator 16 is about to rotate due to the vibration of the vehicle body, the driving force is inhibited by the worm gear 42 having the decreased normal efficiency to become difficult to be transmitted to the rear wheels Wr, Wr, whereby the change in steering angle of the rear wheels Wr, Wr is prevented.

The above description is made to a case where the abnormality occurs in the steering system for the rear wheels Wr, Wr, and the operation of the actuator 16 is stopped. However, the function of inhibiting the reverse transmission of the driving force by the worm gear 42 and the irreversible clutch mechanism 51 is also exhibited when the steering system for the rear wheels Wr, Wr is functioning normally. For example, an electric current is conventionally supplied to the actuator 16 so that the steering angle of the rear wheels Wr, Wr is not changed due to an external force in such a case where the vehicle travels in a straight direction at a high speed, thereby maintaining the steering angle. According to the present invention, however, even if the electric current supplied to the actuator 16 is terminated, any change in steering angle for the rear wheels Wr, Wr is prevented by the worm gear 42 and the irreversible clutch mechanism 51, which can contribute to a reduction in electric power consumption by the actuator 16.

In addition, because the irreversible clutch mechanism 51 is disposed within the worm wheel 41 of the worm gear 42, the space for these components can be reduced, and the size of the entire rear-wheel steering device is reduced, as compared with a case where the worm gear 42 and the irreversible clutch mechanism 51 are disposed independently from each other.

Figure 7:
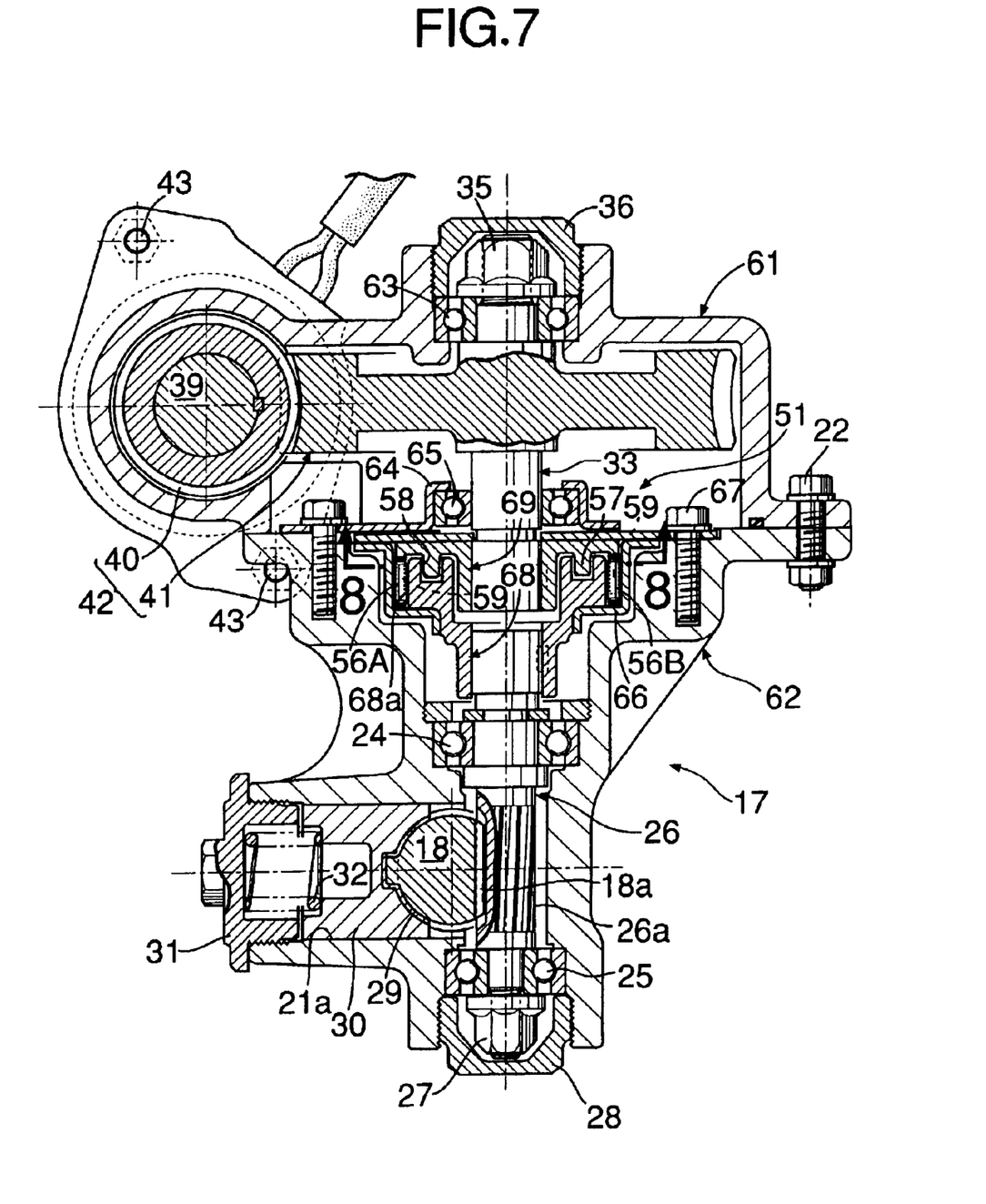
FIG. 7 is a view similar to FIG. 3.
Figure 8:
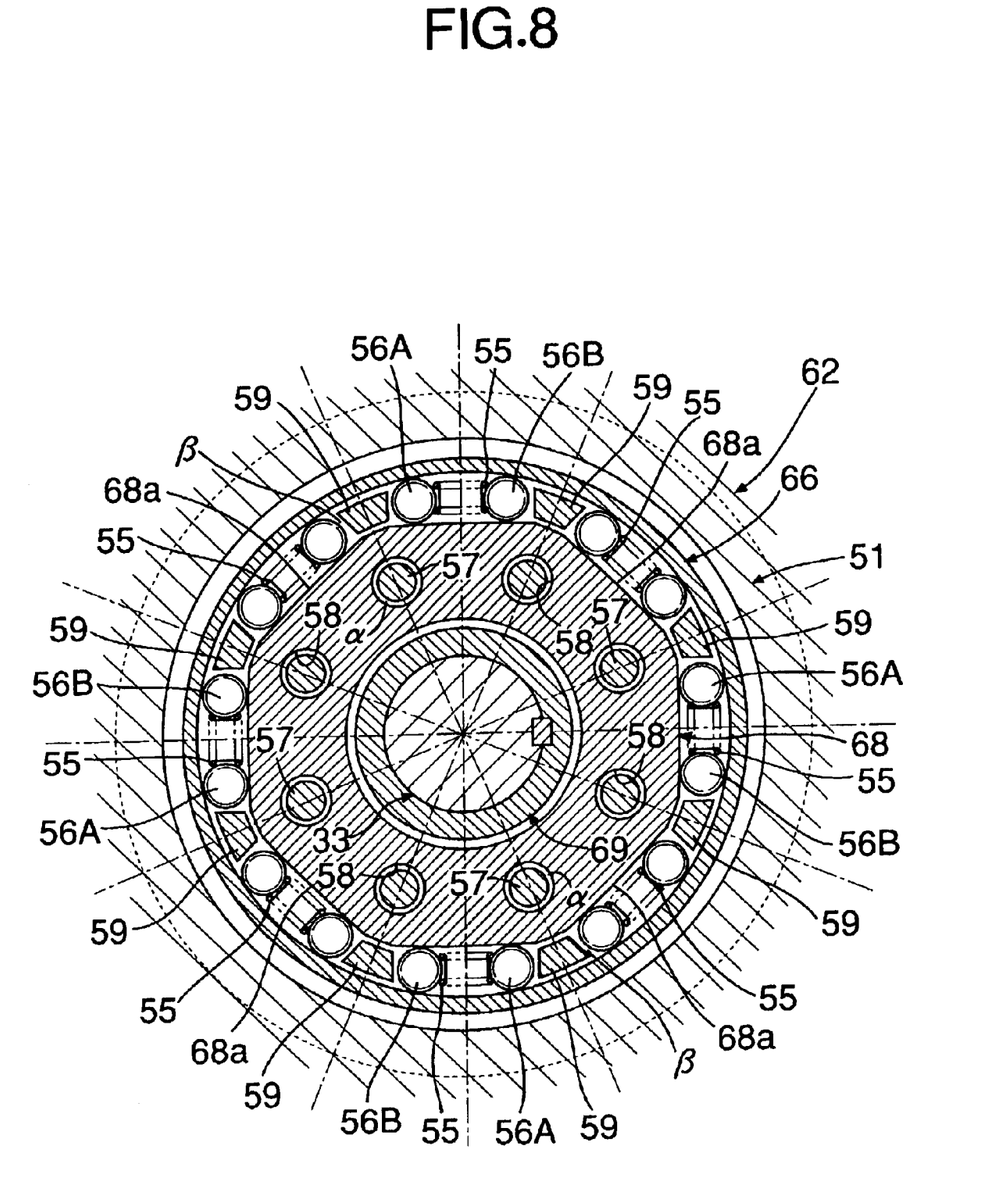
FIG. 8 is a sectional view taken along a line 8—8 in FIG. 7.

A second embodiment of the present invention will now be described with reference to FIGS. 7 and 8.

A steering gear box 17 for the rear wheels Wr, Wr in the second embodiment includes an upper housing 61 and a lower housing 62. An upper portion of an input shaft 33 is supported at the upper housing 61 with a ball bearing 63 interposed therebetween. A lower portion of the input shaft 33 is supported on an upper surface of the lower housing 62 by a ball bearing 65 supported on a bearing holder 64. A stationary member 66 corresponding to the outer member 52 in the first embodiment is fixed to the upper surface of the lower housing 62 by a bolt 67. A follower member 68 corresponding to the inner member 53 in the first embodiment is fixed to an upper end of an output shaft 26 supported at the lower housing 62 by a pair of ball bearings 24 and 25. A driving member 69 fixed to a lower end of an input shaft 33 and the follower member 68 fixed to the upper end of the output shaft 26 vertically face each other within the stationary member 66.

A pair of needle rollers 56A and 56B and a spring 55 for biasing the needle rollers 56A and 56B away from each other, are disposed between an inner peripheral surface of the stationary member 66 and each of eight flat faces 68a formed on an outer periphery of the follower member 68. A plurality of pins 57 axially protrude from a lower surface of the driving member 69, and are loosely fitted into a plurality of pinholes 58 made in an end face of the follower member 68, so that an annular clearance a is provided between each of the pins 57 and a wall of each of the pinholes 58. Each of a plurality of disengaging projections 59 axially protrudes from the driving member 69, and faces circumferentially opposed sides of the pair of the needle rollers 56A and 56B with a clearance β left therebetween.

Thus, also according to the present embodiment, it is possible to permit the transmission of a driving force from the side of the actuator 16 (the side of the driving member 69) toward the driving wheels Wr, Wr (toward the follower member 68) and to inhibit the transmission of the driving force in a reverse direction, by the action of an irreversible clutch mechanism 51 having substantially the same structure as the irreversible clutch mechanism 51 in the first embodiment. That is, the same function and effect as those in the first embodiment can be exhibited, excluding that the irreversible clutch mechanism 51 is disposed outside the worm wheel 41.

Although the embodiments of the present invention have been described in detail above, it will be understood that various modifications in design may be made without departing from the spirit and scope of the invention defined in the claims.

For example, the irreversible clutch mechanism 51 is not limited to the worm gear 52, and may be another type of a gear mechanism such as a hypoid gear and the like.

The worm gear 42 is disposed at an upstream location in the driving force-transmitting path, and the irreversible clutch mechanism 51 is disposed at a downstream location in the driving force-transmitting path in each of the embodiments, but they may be disposed in a reverse order.

What is claimed is:

1. A rear-wheel steering device for a vehicle, which is designed to steer rear wheels by operation of an actuator in operable association with steering of front wheels by operation of a steering wheel, said rear-wheel steering device comprising:

an irreversible gear mechanism which is disposed at an upstream location in a power-transmitting path which transmits a driving force from the actuator to the rear wheels and which is adapted to permit the transmission of the driving force from the actuator toward the rear wheels and to inhibit the transmission of the driving force in a reverse direction; and an irreversible clutch mechanism which is disposed at a downstream location in said power-transmitting path and which is adapted to permit the transmission of the driving force from the actuator toward the rear wheels and to inhibit the transmission of the driving force in the reverse direction.

2. A rear-wheel steering device for a vehicle according to claim 1, wherein said irreversible gear mechanism comprises a worm and a worm wheel, and said irreversible clutch mechanism is disposed within said worm wheel.

3. A rear-wheel steering device for a vehicle according to claim 1, wherein said irreversible gear mechanism comprises a worm and a worm wheel.

4. A rear-wheel steering device for a vehicle according to claim 3, wherein a reverse efficiency of said worm and worm wheel is set at zero in a region where a friction coefficient of meshed portions of said worm and worm wheel is a predetermined value.

5. A rear-wheel steering device for a vehicle according to claim 1, wherein said irreversible clutch mechanism has a smaller chattering than that of said irreversible gear mechanism.

6. A rear-wheel steering device for a vehicle, which is designed to steer rear wheels by operation of an actuator in operable association with steering of front wheels by operation of a steering wheel, said rear-wheel steering device comprising an irreversible gear mechanism and an irreversible clutch mechanism, which are disposed in a power-transmitting path for transmitting a driving force from the actuator to the rear wheels and which are adapted to permit the transmission of the driving force from the actuator toward the rear wheels and to inhibit the transmission of the driving force in a reverse direction.

7. A rear-wheel steering device for a vehicle according to claim 6, wherein said irreversible gear mechanism comprises a worm and a worm wheel, and said irreversible clutch mechanism is disposed within said worm wheel.

8. A rear-wheel steering device for a vehicle according to claim 6, wherein said irreversible gear mechanism comprises a worm and a worm wheel.

9. A rear-wheel steering device for a vehicle according to claim 8, wherein a reverse efficiency of said worm and worm wheel is set at zero in a region where a friction coefficient of meshed portions of said worm and worm wheel is a predetermined value.

10. A rear-wheel steering device for a vehicle according to claim 6, wherein said irreversible clutch mechanism has a smaller chattering than that of said irreversible gear mechanism.

11. A rear-wheel steering device for a vehicle according to claim 6, wherein said irreversible clutch mechanism and said irreversible gear mechanism are provided in series in said power-transmitting path.

12. A rear-wheel steering device for a vehicle according to claim 11, wherein said irreversible clutch mechanism is disposed at a downstream location in said power-transmitting path as compared to said irreversible gear mechanism.

* * * * *

UNITED STATES PATENT AND TRADEMARK OFFICE
CERTIFICATE OF CORRECTION

PATENT NO. : 6,851,510 B2
DATED : February 8, 2005
INVENTOR(S) : Furumi et al.

It is certified that error appears in the above-identified patent and that said Letters Patent is hereby corrected as shown below:

Column 5,
Line 26, change "so that an annular clearance a" to -- so that an annular clearence $\alpha$ --;
Line 54, change "the clearance a is soon" to -- the clearance $\alpha$ is soon --.

Column 6,
Line 5, change "clearances a are narrowed" to -- clearances $\alpha$ are narrowed --;

Column 8,
Line 4, change "an annular clearance a" to -- an annular clearance $\alpha$ --.

Column 9,
Line 17, change "worm wheel is a" to -- worm wheel is $\geq$ a --.

Column 10,
Line 14, change "worm wheel is a" to -- worm wheel is $\geq$ a --.

Signed and Sealed this

Twenty-fourth Day of May, 2005

JON W. DUDAS
*Director of the United States Patent and Trademark Office*

UNITED STATES PATENT AND TRADEMARK OFFICE
CERTIFICATE OF CORRECTION

PATENT NO. : 6,851,510 B2 Page 1 of 1
APPLICATION NO. : 10/370419
DATED : February 8, 2005
INVENTOR(S) : Furumi et al.

It is certified that error appears in the above-identified patent and that said Letters Patent is hereby corrected as shown below:

Column 5,
Line 26, change "so that an annular clearance a" to -- so that an annular clearance $\alpha$ --;
Line 54, change "the clearance a is soon" to -- the clearance $\alpha$ is soon --.

Column 6,
Line 5, change "clearances a are narrowed" to -- clearances $\alpha$ are narrowed --;

Column 8,
Line 4, change "an annular clearance a" to -- an annular clearance $\alpha$ --.

Column 9,
Line 17, change "worm wheel is a" to -- worm wheel is $\geq$ a --.

Column 10,
Line 14, change "worm wheel is a" to -- worm wheel is $\geq$ a --.

This certificate supersedes Certificate of Correction issued May 24, 2005.

Signed and Sealed this

Twenty-fourth Day of October, 2006

JON W. DUDAS
*Director of the United States Patent and Trademark Office*